United States Patent [19]

Iwata et al.

[11] 4,117,390
[45] Sep. 26, 1978

[54] DOUBLE-VOLTAGE, AUTOMOTIVE-TYPE ALTERNATOR

[75] Inventors: Yoriaki Iwata, Toyoake; Suguru Sato, Oobu, both of Japan

[73] Assignee: Robert Bosch GmbH, Stuttgart, Germany

[21] Appl. No.: 709,255

[22] Filed: Jul. 28, 1976

[30] Foreign Application Priority Data

Aug. 9, 1975 [JP] Japan .................. 50/110183[U]

[51] Int. Cl.² .............................................. B60L 1/02
[52] U.S. Cl. ..................................... 322/90; 219/202; 310/198; 310/200
[58] Field of Search ............... 219/202, 203, 279; 322/90, 29, 32; 310/198, 200; 320/61

[56] References Cited

U.S. PATENT DOCUMENTS

| | | | |
|---|---|---|---|
| 2,506,809 | 5/1950 | Nims | 322/90 X |
| 3,012,186 | 12/1961 | Inasko | 322/90 |
| 3,267,353 | 8/1966 | Franklin | 322/90 |
| 3,400,318 | 9/1968 | Hill | 322/29 X |
| 3,668,419 | 6/1972 | Cherry | 219/202 X |
| 3,793,544 | 2/1974 | Baumgartner et al. | 322/90 X |
| 3,895,213 | 7/1975 | Levin | 219/203 |
| 4,045,718 | 8/1977 | Gray | 322/90 X |

Primary Examiner—Robert J. Hickey
Attorney, Agent, or Firm—Flynn and Frishauf

[57] ABSTRACT

To provide a-c output at a voltage substantially higher than normal automotive voltage of 12–24 V, for example output voltage in the 80 to 90 V range to operate windshield and other glass pane heaters, a three-phase alternator is star-connected and has two armature windings which, for example, may be serially connected or may be separately wound, on the same stator, one winding being of comparatively few turns of heavy wire and connected to a rectifier to provide normal d-c on-board voltage for the vehicle, stored in a battery, the voltage being controlled by a voltage regulator connected to the d-c output terminals; the other winding, for example of a much larger number of turns of finer wire providing the high-voltage output at terminals adapted for connection to the heater wires in the windshield, or rear windows, or other window panes.

6 Claims, 4 Drawing Figures

VOLTAGE REG.

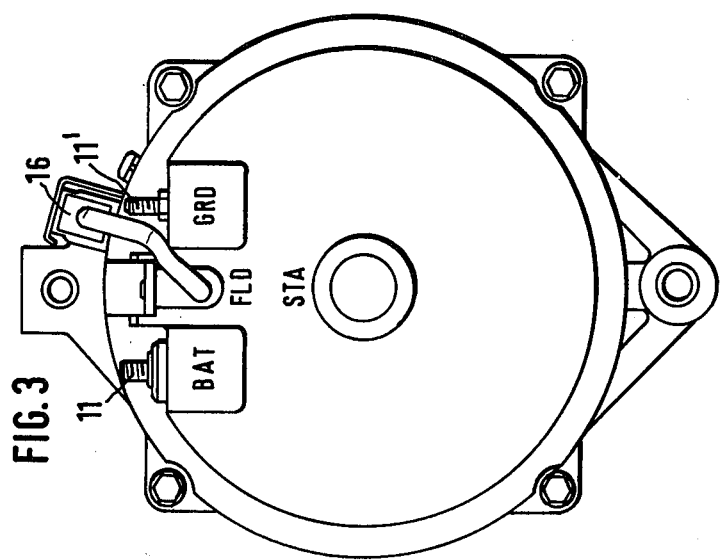
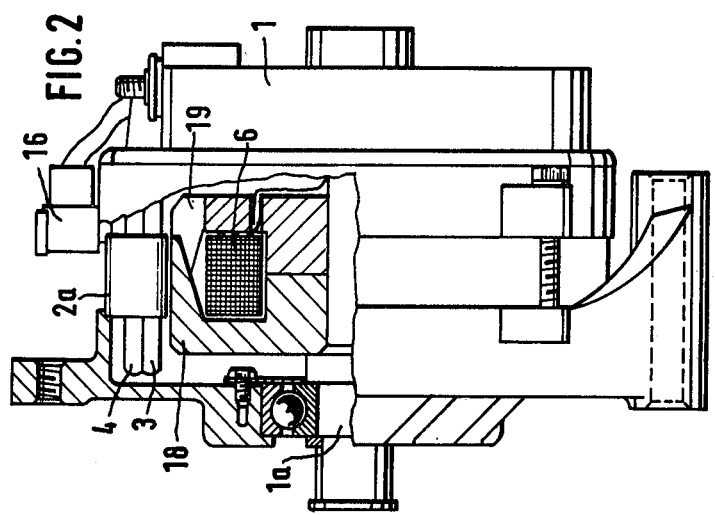

DOUBLE-VOLTAGE, AUTOMOTIVE-TYPE ALTERNATOR

The present invention relates to a-c generators, and more particularly to a dual-voltage, automotive-type alternator to provide two output voltages from one generator structure.

In general, automotive vehicles have on-board voltages of nominal value between 12 to 24 volts. Heater elements, particularly those embedded in the windshield, rear window, or other panes of the vehicle, require heating voltages which are higher, for example 80 to 90 V. In systems which have previously been used to heat wires embedded, for example, in the windshield of an automotive vehicle, or in the rear window pane thereof, it has been customary to utilize separate generators which had an excited field, the field excitation being derived from the d-c 12 (or 24) V vehicle network. The a-c terminals then provided the necessary higher operating voltages to energize heater wires. The separate generator for the heater voltage was, usually, driven in common with the normal alternator supplying the on-board 12 V (for example), by drive from the engine of the automotive vehicle. Thus, the customary systems required two alternators, causing not only additional costs in construction, but further requiring substantial additional space within the engine compartment of the vehicle and necessitating additional labor for assembly and maintenance. Operating two generators in tandem from the engine also resulted in a decrease in reliability and in increased requirements for maintenance.

It is an object of the present invention to provide a generator system for automotive vehicles which can easily provide low-voltage d-c for storage in the vehicle battery and for connection to customary vehicle appliances and loads, while additionally providing electrical power at substantially higher voltage to operate, for example, heater elements embedded in glass panes.

Subject matter of the present invention: Briefly, a rotating field is generated in an alternator having a single stator structure which, in accordance with the present invention, is wound with two windings; one of the windings, preferably, has a lower number of turns than the other, but of substantially heavier wire, and is connected to the usual bridge rectifier. This winding is star-connected, the bridge rectifier in turn providing the d-c output from the generator. This output is connected to the vehicle battery and also to a voltage regulator which provides signals to suitably energize the field to maintain the output voltage constant. The second winding may be connected in series with the first winding and is brought out directly at a-c high-voltage terminals; it is of finer wire and with more turns; it may be separately connected to a center star point. The generator, preferably, is a three-phase alternator.

The alternator in accordance with the present invention has the specific advantage that the main generator winding, of heavy wire, provides sufficient output power for the on-board electrical network of the vehicle, and at a voltage which is both safe and easy to handle in combination with storage by a storage battery. Additionally, however, electrical power at substantially higher voltage, as required by the finer wires of embedded heater elements, is made available, the same iron core serving as the armature structure. Thus, the efficiency of operation is high, and the requirements for additional space substantially reduced. The generator can be easily and cheaply constructed and requires no more maintenance than a single-voltage generator which by and itself does not have sufficient output to energize embedded heater wires.

The invention will be described by way of example with reference to the accompanying drawings, wherein:

FIG. 2 is a side view, partly in section, of the alternator in accordance with the present invention;

FIG. 3 is a front view of the alternator of FIG. 2; and

Figure 5:
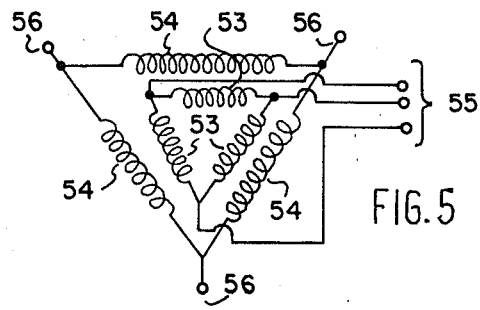
Figure 1:
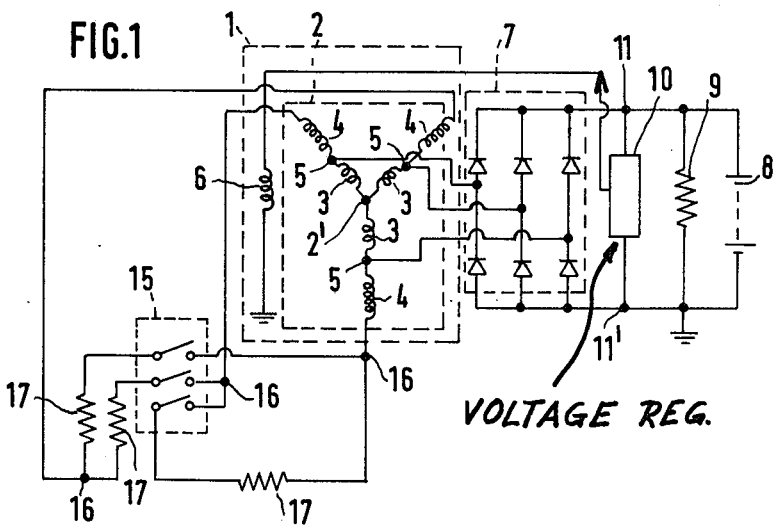
FIG. 1 is a highly schematic circuit diagram of an electrical on-board vehicle system using the alternator in accordance with the present invention, and also illustrating the connection diagram of the alternator.

The alternator of FIGS. 1–3 is a three-phase generator 1 which has a stator winding 2 secured to the armature core laminations 2a. The armature is star-connected and has a center or star point 2' and three stator windings, each of which is formed by a first, main winding portion 3 and a second winding portion 4. The three phases of the first and second winding portions are connected in series at a common junction 5; thus, the respective phases of the two armature windings are serially connected, the phases themselves being star-connected and the winding portions 3, 4 being joined at the junctions 5.

The first armature winding portion 3 has a lower number of turns than the second armature winding portion 4. The diameter of the wire of the portion 3 is much greater than that of the wire of portion 4. Both winding portions 3, 4 are located on the same armature core lamination stack 2a (see FIG. 2).

A field winding 6 provides field excitation for the alternator. The three-phase output derived at junction terminals 5 is rectified in a three-phase bridge rectifier 7 to provide d-c output by connecting the common junctions 5 with the three-phase bridge rectifier 7. A battery 8 and a load 9 can be connected to the output of the rectifier 5, schematically indicated at terminals 11, 11'. A voltage regulator 10, connected in customary manner between the output terminals 11, 11' of the rectifier and having a control terminal, is connected to the field winding 6.

The terminal ends of the second armature portions 4 are brought out to end terminals 16 to provide high-voltage terminals from the alternator. Terminals 16 are connected over switch 15 to heater elements 17, for example to heat, selectively and as controlled, the windshield, the rear window, or other glass panes, by connecting heater elements 17 through switch 15 to terminals 16. The heater elements 17 are delta-connected.

The electrical power generated in the two winding portions 3, 4 is proportional to the change of the flux linkages and to the speed of the alternator 1, as well as to the turns of the windings of the respective winding portions 3, 4. If an ignition switch (not shown) is closed and an internal combustion engine (not shown) to drive the alternator is started, current will flow through voltage regulator 10 to field winding 6. Claws 18, 19 of the field or excitation system secured to the shaft 1a of the generator will then cause voltages to be generated in the armature windings 3, 4. At a predetermined voltage value, that is, when the voltage generated in the armature winding 3 reaches a predetermined value, rectifier 7 will then supply power to charge battery 8. Additionally, the output terminals 16 will have a-c available to energize the heating elements. It can be calculated that the ratio of turns of the windings of the two armature portions 3, 4 must be approximately 1:8 in order to obtain an effective a-c output voltage of about 90 V at the terminals 16, with an on-board output voltage at the terminals 11, 11' of about 12 V.

The first stator winding 3 is star-connected, and the heater elements 17 are delta-connected; the heater elements 17 could also be star-connected.

Figure 4:
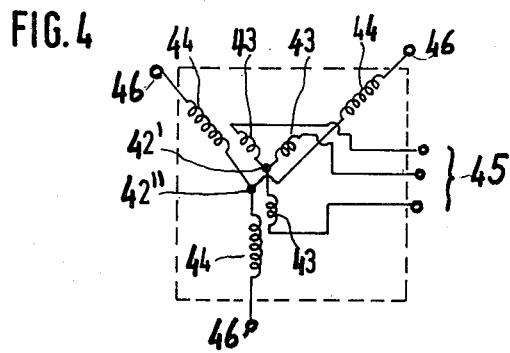
FIG. 4 is a circuit diagram illustrating a modification of the connection of the windings of the alternator.

In the embodiment of FIG. 4, the winding portions 43, 44 are brought out to respective individual terminals 45, 46 and have separate center or star terminals 42', 42", respectively. Thus, and as shown in FIG. 4, the winding portions 43, 44 are not serially connected but, rather, the windings are separate, each one being separately star-connected. The windings 42, 43 are, of course, as before wound on the same armature core laminations, with the number of turns and wire sizes suitably selected to match required or demanded outputs from the alternator.

Various changes and modifications may be made within the scope of the inventive concept.

We claim:

1. Dual-voltage, automotive-type power supply system to provide high-voltage a-c and lower-voltage d-c, comprising
  a three-phase a-c generator having an excitable field winding (6, 18, 19);
  a stator (2) having a core;
  star-connected armature (3, 4) windings on the stator;
  the armature windings having first and second armature winding portions (3, 4; 43, 44, 53, 54) which are located on the same stator armature core (2a), and both exposed to the magnetic field from said field winding;
  the first armature winding portion (3) having fewer turns and being of larger wire than the second armature winding portion (4);
  a three-phase bridge-type multi-element rectifier (7) connected to the first armature winding portion (3) and having output terminals (11, 11') providing low-voltage d-c;
  and wherein the two armature winding portions are serially connected, the first armature winding portion (3) being commonly connected to the center or star point (2') of the star connection, the other end terminals being connected to a junction which is common with one end terminal of the other armature winding portion (4) and further to the input of said three-phase bridge-type rectifier (7), the other end terminals of the other armature winding portions (4) forming a-c high-voltage output terminals (16).

2. Generator according to claim 1, wherein the turns ratio of said winding portions is approximately 1:8.

3. Generator according to claim 1, in combination with a voltage regulator (10), wherein the voltage regulator (10) is connected to the output terminals (11, 11') providing the low-voltage d-c and has a control terminal connected to the field winding (6).

4. Generator according to claim 3, in combination with an automotive vehicle having a secondary battery (8), wherein the output terminals (11, 11') providing the low-voltage d-c are connected to said secondary battery (8), and to loads (9) on said automotive vehicle.

5. Generator according to claim 1, in combination with an automotive vehicle having heated glass panes having heater wire elements (17), and wherein the high-voltage output terminals (16) are connected to said heater elements (17).

6. Generator according to claim 1, the turns ratio of said winding portions being about 1:8;
  said generator being in combination with a motor vehicle and with a voltage regulator (10), the output terminals (11, 11') providing the low-voltage d-c being connected to the voltage regulator, the voltage regulator control terminal controlling current flow through the field winding (6);
  the secondary battery (8) of the vehicle and the vehicle loads (9) being connected to the low-voltage d-c output terminals;
  and heater wire elements (17) applied to at least the windshield of the vehicle and connected to the high-voltage output terminals (16).

* * * * *

UNITED STATES PATENT AND TRADEMARK OFFICE
CERTIFICATE OF CORRECTION

PATENT NO. : 4,117,390
DATED : September 26, 1978
INVENTOR(S) : Yoriaki IWATA and Suguru SATO It is certified that error appears in the above-identified patent and that said Letters Patent are hereby corrected as shown below:

On Page 1 of patent, line [73] Assignee: should be NIPPONDENSO CO., LTD., Aichi-ken, Japan line [54] Change title to "DUAL-VOLTAGE, AUTOMOTIVE-TYPE ALTERNATOR"

Signed and Sealed this

Twenty-seventh Day of March 1979

[SEAL]

Attest:

RUTH C. MASON
Attesting Officer

DONALD W. BANNER
Commissioner of Patents and Trademarks